June 23, 1942.  J. O'F. CLARK  2,287,293
LINK
Filed April 26, 1941
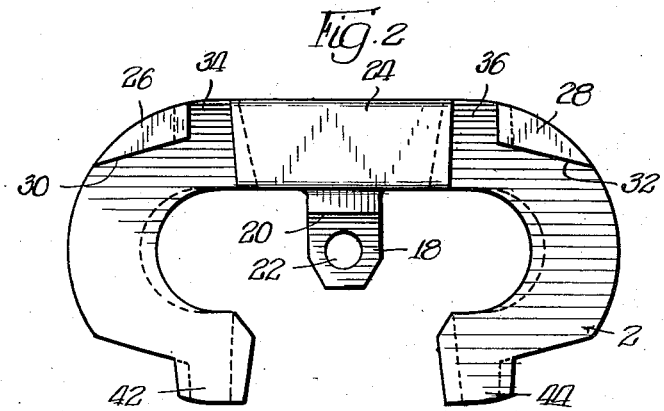
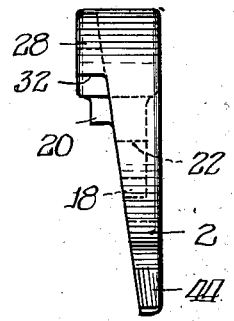
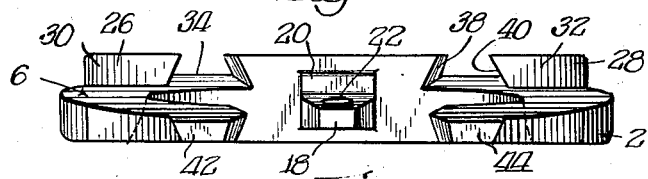
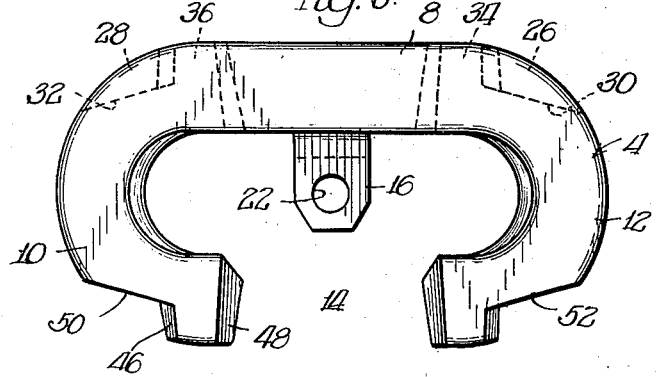
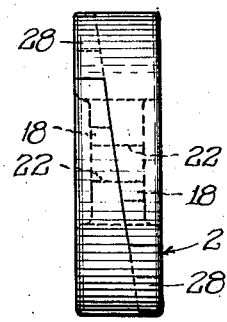
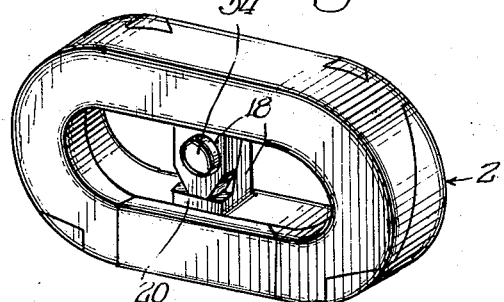
INVENTOR.
John O'Fallon Clark,
BY Wilkinson, Huxley, Byron & Knight
Attys Patented June 23, 1942

2,287,293

UNITED STATES PATENT OFFICE 2,287,293

LINK

John O'Fallon Clark, University City, Mo., assignor to The American Brake Shoe and Foundry Company, New York, N. Y., a corporation of Delaware Application April 26, 1941, Serial No. 390,453

6 Claims. (Cl. 59—87)

The present invention relates to links which, for the purpose of adapting them to be introduced into a chain or otherwise connected with existing open structural elements, are composed of two link members separable in a cleavage plane and each having an opening in its side admitting the element to which it is to be connected. More particularly, the invention relates to cleavage links in which the plane of separation involves the side elements as well as the end elements of the link, and the spaced ends which define the opening in each link member are secured upon the solid side of the complementary link member to prevent the said link members from pulling apart when assembled in a chain under tension.

Among the objects of the present invention is to provide a novel link of the type herein identified in which the members are of such a design as to facilitate production thereof from manganese steel or other alloys calling for the use of the grinder in finishing. The invention has proceeded upon the theory of providing a novel link of the type generally referred to above which can be readily and easily assembled by relative lateral movement of the link members into position in embracing relation to the element to which the link is to be connected, and which members of the link have their ends locked in association with the complementary link member, and the said link members being secured to prevent lateral movement by overlapping interlocking prong members disposed substantially centrally of the said link members.

The present invention contemplates a novel link assembly wherein the opening of each of the link members is received by a filler on the complementary link member when the side members are assembled and wherein transverse recesses are formed for the ends of the link members lying substantially in the plane of cleavage and defined in part by the said filler and in part by lugs spaced longitudinally of the end of the filler and serving as abutment means for the ends of the said link members.

Another object of the present invention is to provide a novel link of the type hereinabove described wherein the walls defining the recesses are undercut to receive the ends of the complementary link member which have wedge forming surfaces disposed to cooperate with said undercut walls.

As a still further object of the present invention, the said undercut walls converge outwardly to cooperate with the similarly disposed wedge forming surfaces of the ends of the complementary link members to facilitate the assembly and disassembly of the link members.

Other objects, features, capabilities and advantages are comprehended by the invention, as will later appear and as are inherently possessed thereby.

Referring to the drawing:

Figure 1 is a view in perspective of a link made in accordance with the present invention;

Figures 2 and 3 are plan views of the inner and outer faces of link members used in forming the assembly according to Figure 1 of the drawing;

Figure 4 is a view in side elevation of the link member shown in Figure 2 of the drawing;

Figure 5 is a view in end elevation of the link member shown in Figure 2 of the drawing; and Figure 6 is a view in end elevation of the assembled link.

Referring now more in detail to the drawing, an embodiment selected to illustrate the present invention is shown as comprising two complementary link members 2 and 4 of substantially identical construction, these members being separable upon the plane of cleavage represented as 6 which, while including both sides 8 and the ends 10 and 12, is at a substantial angle to the general plane of the link so that it leaves the side 8 with the major thickness of the link member and the side containing opening 14 with a minor thickness.

The link members are substantially E-shaped to include the side and end elements as above described, and likewise a substantially centrally disposed prong 16 which has its upper surface 18 in substantially the cleavage plane 6 which terminates in the abutment shoulder 20 laterally of an opening 22 extending through the same.

The side 8 of each of the link members is formed with a filler or lug 24 centrally disposed with respect to the link member which is received within the opening 14 of the complementary link member when the two link members are assembled. Disposed in longitudinally spaced relation at each end of the filler 24 are the lugs 26 and 28 formed at the marginal edges of the link members adjacent the periphery thereof and at the junction between the side 8 and ends 10 and 12 and which lugs are formed with abutting shoulders 30 and 32, respectively, and provide, with the filler, the transversely disposed grooves or recesses 34 and 36.

Each of the transversely disposed grooves or recesses 34 and 36 is defined in part by the undercut end wall 38 of the filler 24 and in part by the undercut end wall 40 of one of the lugs 26 or 28, these undercut walls, as clearly shown in the drawing, converging laterally and outwardly and forming a dove-tailed recess to receive the end projections 42 and 44 at the extremities of the end parts 10 and 12. These projections are formed, as disclosed, by opposed wedge-forming surfaces 46 and 48 tapering slightly transversely and outwardly in converging relation to one another so as to fit within the recesses disposed laterally of the filler 24. The end parts 10 and 12 are formed with the abutment shoulders 50 and 52, respectively, adapted to abut with the abutment shoulders 32 and 30 of the lugs 28 and 26.

As will be clearly apparent from the drawing, the link members are complementary to one another and are easily assembled by relative lateral movement with respect to one another, at which time the end parts 42 and 44 of each of said members are received in grooves formed between the filler and the lugs disposed in longitudinally spaced relation thereto, and that assembly in the manner indicated causes the prongs 16 and 18 to be disposed in overlapping relation to one another with the openings 22 in substantial alignment for receiving a pin or the like 54 which holds the link members in assembled relation with respect to one another.

The present link structure constitutes an improvement over the link disclosed in the J. O'F. Clark Patent No. 1,824,330, issued September 22, 1931, in that no rivets are required to secure the link members together, it having been found that removal of material at the places indicated in the link members of the patent referred to greatly decreases the strength of the link assembly because removal of metal at such critical points decreases the structural strength of the link members, leading to failure of the assembled link while in use. Furthermore, the present design for the complementary link members is such as to facilitate assembly in that the same may be readily placed in assembled relation with respect to one another by relative lateral movement, after which the assembly may be completed by insertion of the pin 54. In addition, the ends of the complementary link members are secured in position by the overhanging walls to prevent their pulling apart when the chain is under tension while in use. The converging relation of the cooperating walls of the recesses and the ends of the link members facilitates assembly and disassembly of the link members forming the assembled link structure.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. A chain link comprising two complementary link members separated in a cleavage plane that includes both the end and side portions of the link and adapted to be assembled by relative lateral sliding of the link members toward one another, each link member having at one side a receiving opening for an element to which the link is to be connected and on its other side a filler for the opening of its complementary link member, each of said link members having lugs spaced from said filler forming positioning abutments for the other of said link members and providing transversely disposed recesses lying substantially in the plane of cleavage adapted to receive the ends of its complementary link member, and means for interlocking the said link members at approximately the central part thereof.

2. A chain link comprising two complementary link members separated in a cleavage plane that includes both the end and side portions of the link and adapted to be assembled by relative lateral sliding of the link members toward one another, each link member having at one side a receiving opening for an element to which the link is to be connected and on its other side a filler for the opening of its complementary link member, each of said link members having lugs spaced from said filler forming positioning abutments for the other of said link members and providing transversely disposed recesses lying substantially in the plane of cleavage adapted to receive the ends of its complementary link member, said lugs being formed with shoulders against which said ends abut longitudinally and laterally, and said link members having overlapping interlocked substantially centrally disposed prongs for securing said link members together.

3. A link as described in claim 1, in which the walls of said filler and lugs defining said transversely disposed recesses are undercut and the ends of the complementary link members are formed with wedge forming surfaces cooperating with said walls to prevent disengagement of the said ends from the recesses of the complementary link member when the link is under tension.

4. A link as described in claim 2, in which the walls of said filler and lugs defining said transversely disposed recesses are undercut and the ends of the complementary link members are formed with wedge forming surfaces cooperating with said walls to prevent disengagement of the said ends from the recesses of the complementary link member when the link is under tension.

5. A link as described in claim 2, in which the centrally disposed prong of each link member is formed with an abutment positioning shoulder cooperating with the central prong of the complementary link member and in which the walls of said filler and lugs defining said transversely disposed recesses are undercut and the ends of the complementary link members are formed with wedge forming surfaces cooperating with said walls to prevent disengagement of the said ends from the recesses of the complementary link member when the link is under tension.

6. A link as described in claim 2, in which the walls of said filler and lugs defining said transversely disposed recesses are disposed in outwardly converging relation and are undercut and the ends of the complementary link members are formed with wedge forming surfaces cooperating with said walls to prevent disengagement of the said ends from the recesses of the complementary link member when the link is under tension.

JOHN O'FALLON CLARK.